US008520648B2

(12) United States Patent
Cordeiro

(10) Patent No.: US 8,520,648 B2
(45) Date of Patent: Aug. 27, 2013

(54) BEACON TRANSMISSION TECHNIQUES IN DIRECTIONAL WIRELESS NETWORKS

(75) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 12/814,530

(22) Filed: Jun. 14, 2010

(65) Prior Publication Data
US 2011/0305228 A1 Dec. 15, 2011

(51) Int. Cl.
*H04W 84/02* (2009.01)

(52) U.S. Cl.
USPC .......................................... 370/338; 370/447

(58) Field of Classification Search
USPC ............ 370/328, 334, 338, 447, 522; 455/68
See application file for complete search history.

(56) References Cited

U.S. PATENT DOCUMENTS

| 7,515,577 | B2* | 4/2009 | Pandey et al. | 370/338 |
| 2005/0227615 | A1* | 10/2005 | Sakoda | 455/7 |
| 2006/0227801 | A1* | 10/2006 | Nanda et al. | 370/447 |
| 2006/0252378 | A1* | 11/2006 | Bishop | 455/68 |
| 2007/0140279 | A1 | 6/2007 | Yang et al. | |
| 2008/0003633 | A1* | 1/2008 | Shin et al. | 435/29 |
| 2008/0137577 | A1* | 6/2008 | Habetha | 370/311 |
| 2008/0137599 | A1 | 6/2008 | Ham et al. | |
| 2008/0279138 | A1* | 11/2008 | Gonikberg et al. | 370/328 |
| 2009/0232126 | A1* | 9/2009 | Cordeiro et al. | 370/350 |
| 2010/0008343 | A1* | 1/2010 | Kish | 370/338 |
| 2010/0085930 | A1 | 4/2010 | Shin et al. | |
| 2010/0118835 | A1* | 5/2010 | Lakkis et al. | 370/336 |
| 2010/0232414 | A1* | 9/2010 | Jeon | 370/347 |
| 2010/0254290 | A1* | 10/2010 | Gong et al. | 370/311 |
| 2011/0075642 | A1* | 3/2011 | Cordeiro et al. | 370/338 |

FOREIGN PATENT DOCUMENTS

| EP | 2104245 A1 | 9/2009 |
| JP | 2005-086524 A | 3/2005 |
| JP | 2005-295400 A | 10/2005 |
| JP | 2006-287661 A | 10/2006 |
| JP | 2008-514133 A | 5/2008 |
| JP | 2008-219554 A | 9/2008 |
| JP | 2009-518967 A | 5/2009 |
| WO | 2007/081614 A2 | 7/2007 |
| WO | 2006/034194 A2 | 5/2008 |
| WO | 2008/069245 A1 | 6/2008 |
| WO | 2011/159404 A2 | 12/2011 |
| WO | 2011/159404 A3 | 2/2012 |

OTHER PUBLICATIONS

International Search Report and Written opinion received for PCT Patent Application No, PCT/US2011/035519, mailed on Dec. 13, 2011, 10 pages.
Cordeiro et al., "IEEE P802.1 1 Wireless LANs PHY/MAC Complete Proposal Specification", IEEE 802. 11.10/0433r2,, Section 11.1.2.2, May 2010, 335 Pages.

(Continued)

*Primary Examiner* — Brian D Nguyen
(74) *Attorney, Agent, or Firm* — Sutherland Asbill & Brennan LLP

(57) ABSTRACT

Techniques for the generation of beacons are disclosed. For instance, embodiments may establish a delay time that is based at least on a directional beacon transmission characteristic of a wireless communications device. In turn, embodiments may determine whether a beacon transmission is received from a remote device during a time period. This time period begins at a start of a beacon interval in a distributed wireless communications network, and has a duration of the delay time. When a beacon transmission is not received from a remote device during the time period, one or more directional beacon transmissions may be sent upon completion of the time period.

15 Claims, 7 Drawing Sheets

(56) References Cited

OTHER PUBLICATIONS

Office Action received for Japanese Patent Application No. 2011-105154, mailed on Aug. 28, 2012, 2 pages of English Translation and 1 page of Japanese Office Action.

International Preliminary Report on Patentability and Written Opinion received for PCT Application No. PCT/US2011/035519, issued on Dec. 14, 2012, 6 pages.

* cited by examiner

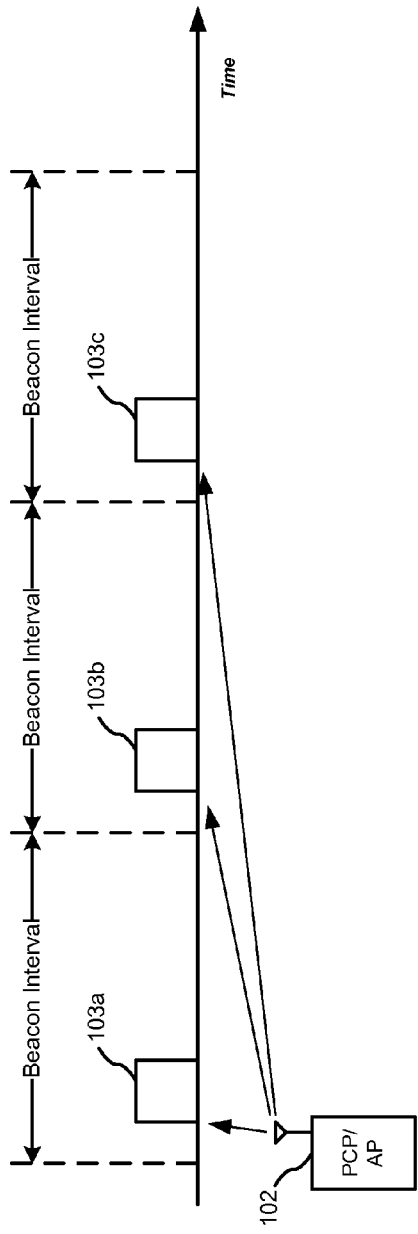
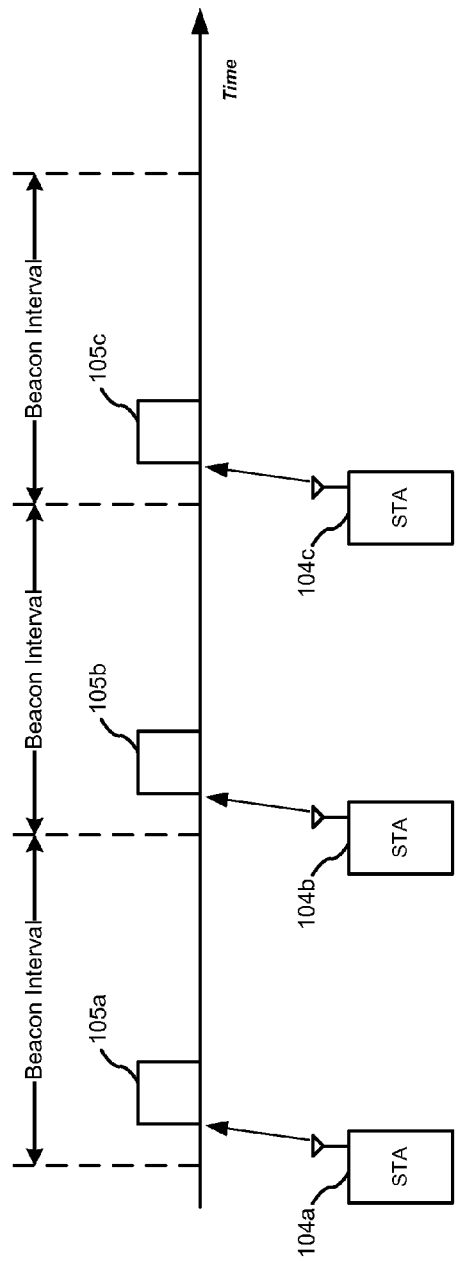
FIG. 1A
FIG. 1B

BEACON TRANSMISSION TECHNIQUES IN DIRECTIONAL WIRELESS NETWORKS

BACKGROUND

The proliferation of mobile, personal and handheld devices has led to an explosion of peer-to-peer (P2P) usages. The P2P model is characterized by the fact that any station (STA) can potentially send wireless communications to any other STA directly, without having to route its transmissions through a special station such as an access point (AP).

To support these P2P usages, several network architectures at the media access control (MAC) layer are possible. For example, a centralized architecture such as an infrastructure basic service set (BSS) or a personal BSS (PBSS) can make use of their respective central network coordinators (AP and PCP, respectively) to setup these direct P2P links. These architectures as defined in the Institute of Electrical and Electronic Engineers (IEEE) 802.11 wireless local area network (WLAN) standard.

Another approach provided by the IEEE 802.11 WLAN standard is called the independent BSS (IBSS). This approach provides a distributed architecture, in which there is no central coordinator. Thus, an IBSS provides for any STA to communicate directly with another STA.

There are implications associated with choosing a centralized or a distributed architecture. In a centralized architecture provided by IEEE 802.11, only the central coordinator transmits beacon frames to synchronize all STAs in the networks. However, in a distributed architecture provided by IEEE 802.11, any STA can transmit beacon frames.

Interest in millimeter wave (e.g., 60 Gigahertz) networks is increasing. Such networks may make extensive use of beam-formed (directional) transmissions. However, the employment of directional transmissions adds challenges to the transmission of beacons. For example, instead of sending a particular beacon only once, a STA may need to repeat a beacon as multiple directional transmissions in order to reach the full extent of the STA's transmission coverage.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 1A and 1B are diagrams of exemplary beacon transmission techniques;

DETAILED DESCRIPTION

Figure 2:
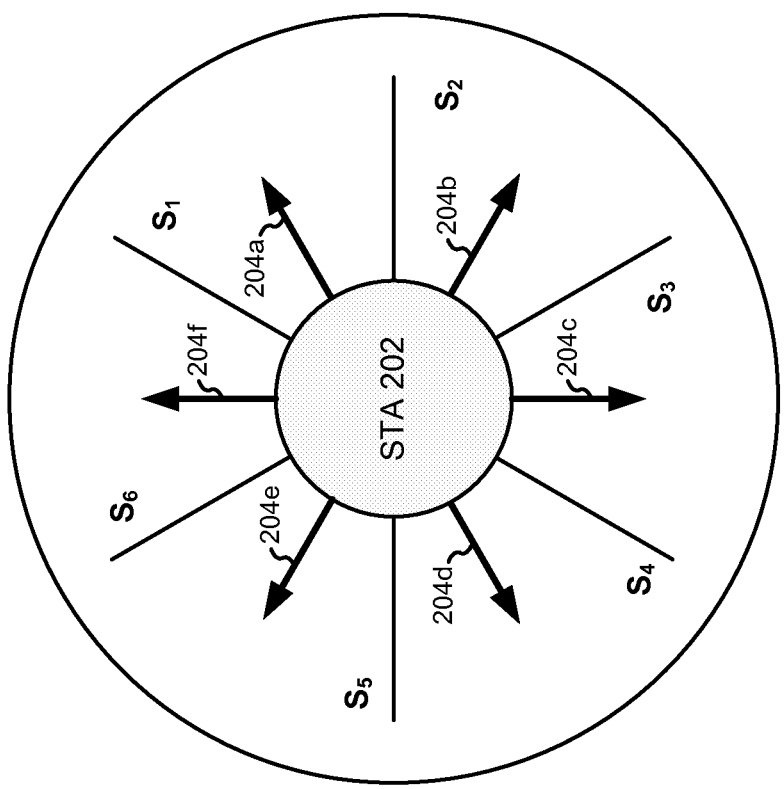
FIG. 2 is a diagram showing a repetition of beacon transmissions across multiple transmission sectors.

Embodiments provide techniques for the generation of beacons. For instance, embodiments may establish a delay time that is based at least on a directional beacon transmission characteristic of a wireless communications device. In turn, embodiments may determine whether a beacon transmission is received from a remote device during a time period. This time period begins at a start of a beacon interval in a distributed wireless communications network, and has a duration of the delay time. When a beacon transmission is not received from a remote device during the time period, one or more directional beacon transmissions may be sent upon completion of the time period.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The techniques described herein may be employed in various types of networks. Examples of such networks include Institute of Electrical and Electronic Engineers (IEEE) 802.15 wireless personal area networks (WPANs), such as Bluetooth networks. Also, these techniques may be employed with IEEE 802.11 wireless local area networks (WLANs) and WiGig networks. WiGig networks are 60 GHz networks defined by the Wireless Gigabit Alliance (such as the version 1.0 WiGig Specification). Further exemplary networks include IEEE 802.16 wireless metropolitan area networks (WMANs), such as WiMAX networks. WiMAX networks may support directional transmissions through beamforming capabilities. Also, the techniques described herein may be employed in millimeter wave (e.g., 60 GHz) networks. These networks are provided as examples, and not as limitations. Accordingly, the techniques described herein may be employed with other network types.

As described above, in a centralized architecture, a central coordinator transmits beacon frames. However, in a distributed architecture, any STA can transmit beacon frames. For example, in the IEEE 802.11 IBSS, a STA transmits a beacon frame at particular time within a beacon interval (BI) if it does not first receive a beacon frame from another STA. However, if the STA first receives a beacon frame from another STA in the BI, the STA cancels its planned beacon transmission for the beacon interval.

Examples of these features are shown in FIGS. 1A and 1B. In particular, FIG. 1A shows centralized network approach, in which a central coordinator device 102 (e.g., a PCP/AP) sending beacon transmissions 103$a$-$c$ within repeating beacon intervals (BIs). In contrast, FIG. 1B shows a distributed network approach, in which various STAs (STAs 104$a$-$c$) respectively send beacon transmissions 105$a$-$c$ within repeating beacon intervals (BIs).

As discussed above, in networks employing directional transmissions (e.g., mmWave or 60 GHz networks), a STA may need to repeat a beacon transmission multiple times in order to cover the full extent of the STA's transmission coverage. FIG. 2 is a diagram showing an example of this repetition. In particular, FIG. 2 shows a STA 202 sending repeated beacon transmissions 204$a$-$f$ in directional sectors $S_1$-$S_6$, respectively. Further, this diagram shows these transmissions being sent across sectors $S_1$-$S_6$ in a clockwise sequence. FIG. 2 is provided for purposes of illustration, and not limitation. Thus, embodiments are not limited to the employment of sectors, or to the illustrated sequence. In fact, any type of transmission pattern (in any quantity and/or any combination) may be employed. Moreover, any sequence may be employed among such transmission patterns.

It is generally considered simpler to adopt a centralized architecture in networks that employ such repetitive beacon transmission procedures. As discussed above, in such centralized architectures, only a central controller device (e.g., PCP/AP) sends beacon transmissions. Accordingly, to maintain simplicity, 60 GHz development work performed thus far has mainly focused on a centralized network architecture.

However, despite providing a certain degree of simplicity, centralized architectures have drawbacks. For instance, centralized architectures require a single STA to coordinate the network and transmit beacons. Providing this functionality can be demanding. For example, many 60 GHz scenarios entail P2P communications that involve battery powered STAs. Thus, in such scenarios, the energy demands for a single STA to handle such coordination responsibilities can be overly burdensome.

Therefore, there is an interest to enhance a distributed architecture (such as the IBSS) so that it operates in a beamformed communications environment. However, this presents a challenge involving the transmission of beacons. More particularly, the employment of existing distributed beacon transmission rules (see the following paragraph) can cause multiple STAs to transmit beacons within the same beacon interval. This is because STAs may be unable to detect each others' beacons due to the directionality of transmissions.

As an example, in the IEEE 802.11 IBSS specification, a STA defers its beacon transmission within a particular beacon interval for a random delay time. This random delay time is uniformly distributed in a range between zero and a range maximum value expressed below in Equation (1).

$$\text{Range Maximum} = 2 \times a\text{CWmin} \times a\text{SlotTime} \qquad (1)$$

In Equation (1), aCWmin is a minimum contention window integer value (e.g., 31) and aSlotTime is on the order of microseconds (e.g., 9 μsec in IEEE 802.11a). As a result, in IEEE 802.11a networks, a STA defers for 279 μsec on average before it transmits its beacon (when it has not received a beacon from another STA during the beacon interval).

However, in 60 GHz networks, such beacon transmission rules do not work well. This is because a STA may send multiple directional beacon transmissions (e.g., as many as 64 directional beacon transmissions in exemplary implementations). As a result, these existing techniques do not to ensure that only a single STA's beacon is sent within each beacon interval.

Thus, there are shortcomings associated with beacon transmission times being based on the duration of a slot time parameter (such as the aSlotTime parameter of IEEE 802.11a networks). Embodiments provide beacon generation techniques for distributed network architectures that may overcome such shortcomings. For instance, embodiments may provide a millimeter wave IBSS beacon generation procedures that are based on a beacon time (BT).

Figure 3:
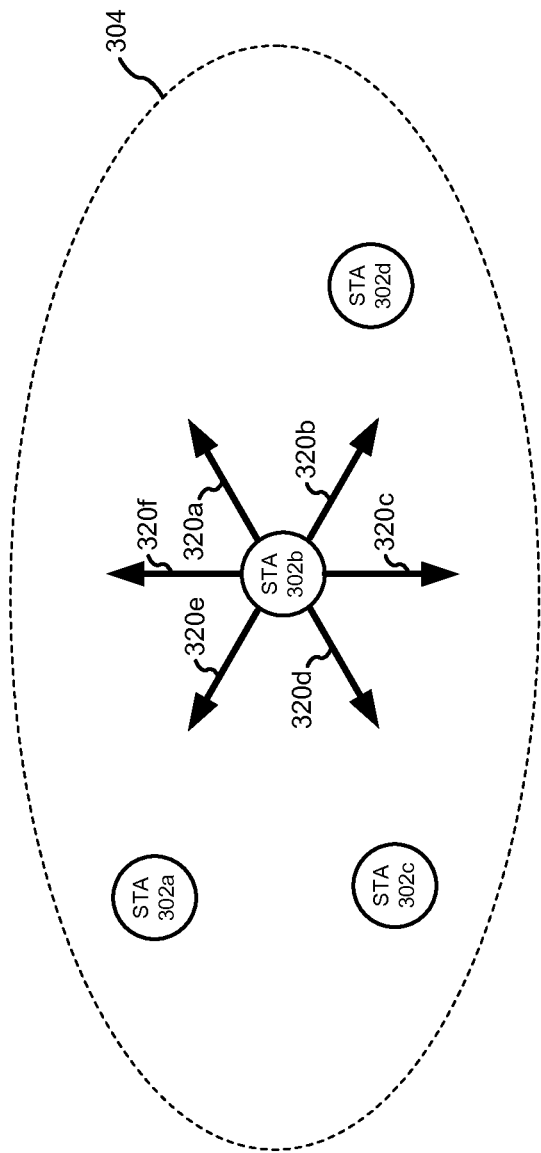
FIG. 3 is a diagram of an exemplary operational environment.

These techniques may be employed in networks that employ beamformed communications. An example of such a network is shown in FIG. 3. In particular, FIG. 3 is a diagram of an exemplary operational environment 300. This environment includes multiple peer devices (also referred to as STAs) 302a-d. Although FIG. 3 shows four STAs, embodiments may involve networks or environments having any number of STA(s).

Together, devices 302a-d participate in a distributed network 304. In embodiments, distributed network 304 may be an IBSS. Further, devices 302a-d may employ directional wireless transmissions when communicating with each other. As an example, FIG. 3 shows device 302b sending directional transmissions 320a-f. These transmissions may comprise millimeter wave (e.g., 60 GHz) signals. Also, directional transmissions 320a-f may convey a single beacon or a single data sequence. Embodiments, however, are not limited to this. For example, directional transmissions 320a-f may convey any combination of one or more beacons or data sequences.

As described above, embodiments may provide beacon generation procedures that are based on a beacon time (BT). A BT is the time in which a STA (e.g., a millimeter wave STA) transmits its multiple directional beacon transmissions. For instance, a BT is the time interval between the start of a STA's first directional (e.g., mm wave) beacon transmission in a particular BI to the end of the STA's last directional beacon transmission in the same BI.

Figure 4:
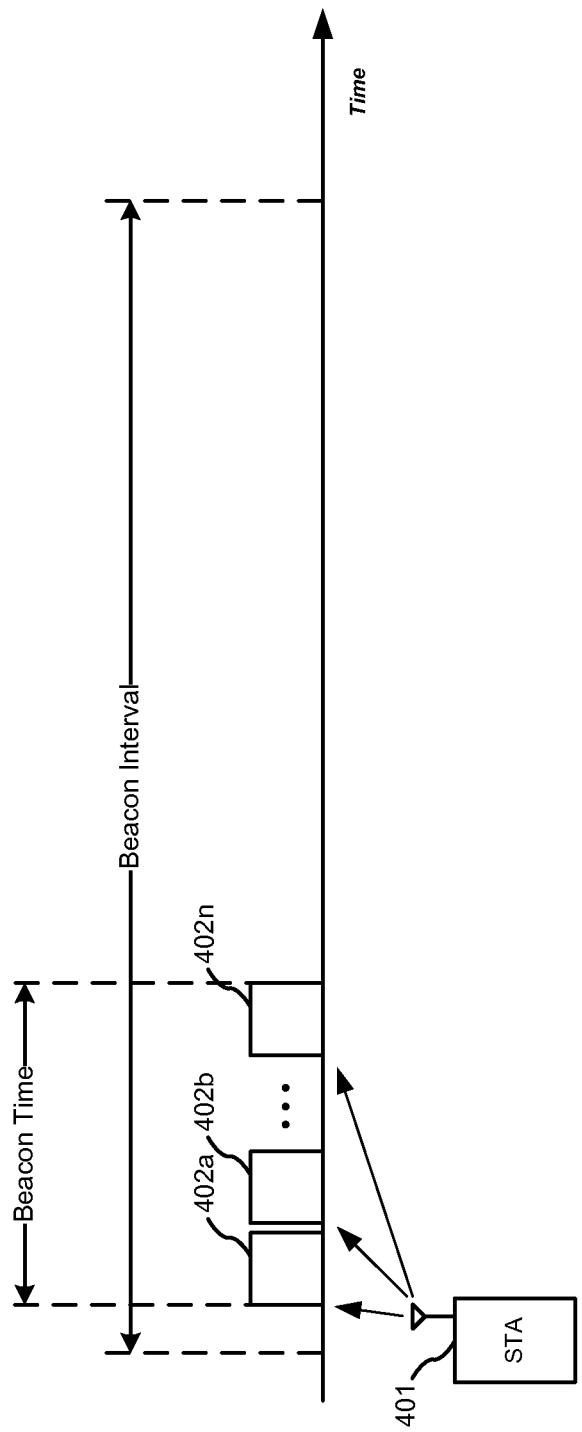
FIG. 4 is a diagram showing a sequence of directional beacon transmissions within a time period called a beacon time (BT)

An exemplary beacon time is shown in FIG. 4. In particular, FIG. 4 shows a sequence of directional beacon transmissions 402a-n transmitted by a STA 401. As shown in FIG. 4, the beginning of the first beacon transmission 402a and the end of the last beacon transmission 402n delineate a BT.

Thus, embodiments may take into account a STA's multiple directional beacon transmissions when scheduling its beacon transmission. This may involve determining a time parameter called BT_Length. BT_Length may be generated in various ways. For example, BT_Length may based on a maximum number of directional beacon transmissions the STA is capable of sending. Alternatively or additionally, BT_Length may be based on how many beacon transmissions a STA will send during an upcoming BT. Exemplary details regarding the generation of BT_Length are provided below.

Based on BT_Length, a delay time may be determined that designates when a STA is eligible to send its multiple directional beacon transmissions. This delay time may be randomly generated such that it is distributed (e.g., uniformly distributed) between zero and a range maximum value expressed below in Equation (2).

$$\text{Range Maximum} = 2 \times a\text{CWminMMwaveIBSS} \times \text{BT\_Length} \qquad (2)$$

In Equation (2), aCWminMMwaveIBSS is a minimum contention window integer value. Embodiments, however, are not limited to this example.

As described above, BT_Length may be based on a maximum number of directional beacon transmissions a STA can send. This approach accommodates a worst case scenario. For example, BT_Length may be calculated in accordance with Equation (3), below.

$$\text{BT\_Length} = \text{MaxDirTransmissions} \times (\text{B\_Time} + \text{SBIFS}) \qquad (3)$$

In Equation (3), MaxDirTransmissions is the STA's maximum number of directional beacon transmissions (e.g., its number of antenna elements), B_Time is the time duration that each directional beacon transmission takes, and SBIFS is an employed inter-frame spacing interval.

As described above, a delay time may be randomly distributed between zero and a maximum value expressed in Equation (2). When BT_Length is determined in accordance with Equation (3), a similar behavior as in the 802.11a IBSS may occur. This is because, over a long period of time, every STA would transmit the same number of beacons and hence achieve fairness in terms of, for example, energy consumption during the BT.

However, as a downside, the BT_Length determination approach of Equation (3) (when using IEEE 802.11a parameters) can lead to delay times that are unacceptably long in most situations. For example, when B_Time=80 μsec (250 bytes at 25 Mbps), MaxDirTransmissions=64, SBIFS=0, and aCWminMMwaveIBSS=31, a STA's average delay time will be 159 milliseconds.

As described above, BT_Length may be based on how many beacon transmissions a STA will send during an upcoming BT. Thus, the maximum number of transmissions (e.g., the number of directional antennas) is not considered in this approach. In other words, if a STA plans to transmit 4 directional beacons in the following BT (regardless of how many antenna elements it has), then (with this approach) its BT_Length may be calculated in accordance with Equation 4, below.

$$BT\_Length = PlannedDirTransmissions \times (B\_Time + SBIFS) \quad (4)$$

In Equation (4), PlannedDirTransmissions is the STA's planned number of directional beacon transmissions for the next BT, B_Time is the time duration that each directional beacon transmission takes, and SBIFS is the employed interframe spacing interval.

With the approach of Equation (4) (e.g., when B_Time=80 µsec, PlannedDirTransmissions=4, SBIFS=0, and aCWminMMwaveIBSS=31) an average delay or deferral time of 9.92 milliseconds is achieved.

Thus, the BT_Length determination approach of Equation (4) may be over 10 times more efficient than the approach of Equation (3). However, contrary to the approach of Equation (3), the approach of Equation (4) does not produce the same behavior as in the IEEE 802.11a IBSS. In other words, it does not produce the same level of fairness in terms of energy consumption since the STA that performs the fewer number of transmissions in a BT has the higher likelihood to transmit the beacon first. Hence, a STA that transmits 4 beacons in a BT will most likely always transmit a beacon before a STA that transmits, say, 32 beacons.

As expressed above in Equation (2), embodiments randomly generate deferral times to be distributed within a range. This range is based on a minimum contention window parameter, aCWminMMwaveIBSS. In embodiments, this parameter may equal the aCWmin parameter (i.e., 31) that is employed in IEEE 802.11a networks. However, this value can yield average deferral times that are quite large (e.g., 10 milliseconds).

IEEE 802.11a employs the same minimum contention window value for both beacon generation and access to the medium (e.g., for data transmissions). However, embodiments may employ a different minimum contention window value (aCWminMMwaveIBSS) for beacon generation. In embodiments the minimum contention window value for beacon generation (aCWminMMwave IBBSS) may be less than the minimum contention window employed for medium access (aCWmin). In embodiments, aCWminMMwave and aCWmin may have equal values (e.g., 31). Alternatively, aCWminMMwave and aCWmin may have different values. For instance, aCWminMMwave may approximately one sixth of aCWmin (e.g., aCWmin=31, and aCWminMMwave=5). Embodiments, however, are not limited to these values or ratios.

Through the employment of different minimum contention window values for beacon generation and medium access, the deferral time in a mmWave IBSS can be significantly reduced (e.g., to a few milliseconds, or even to microseconds when an aggressive approach is desired). Moreover, this approach does not detrimentally impact performance. This is because fairness is not the key goal in millimeter wave networks due to beamformed transmissions. Also, time-division access may be mainly used in millimeter wave networks. Further, the number of devices in millimeter wave usages may typically be relatively small (thus leading to low collision rates).

Figure 5:
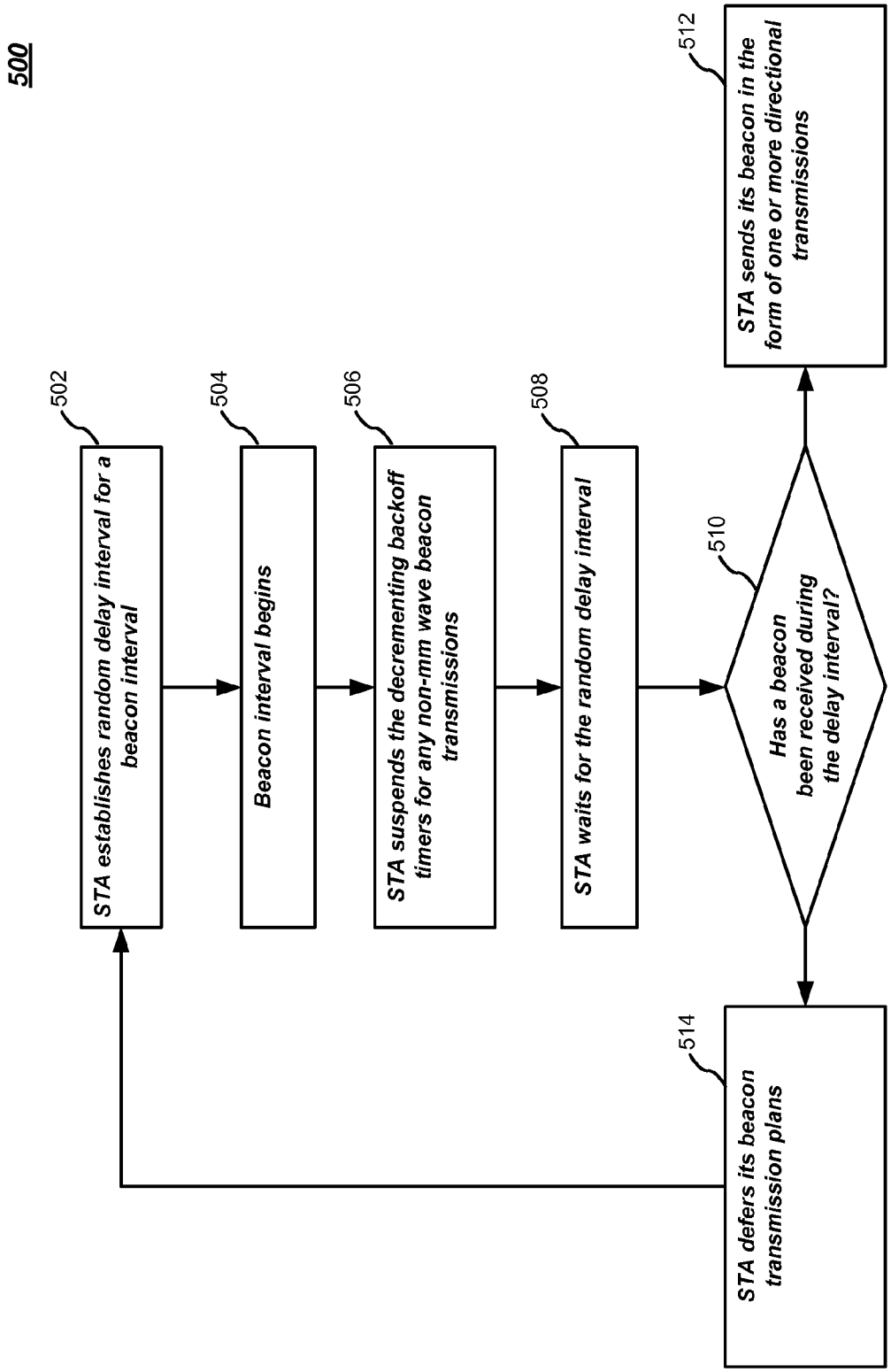
FIG. 5 is a diagram of an exemplary logic flow.

FIG. 5 illustrates an embodiment of a logic flow. In particular, FIG. 5 illustrates a logic flow 500, which may be representative of the operations executed by one or more embodiments described herein. These operations are described in the context of a wireless device (a STA) in a mmWave IBSS. Embodiments, however, are not limited to this context. Although FIG. 5 shows a particular sequence, other sequences may be employed. Also, the depicted operations may be performed in various parallel and/or sequential combinations.

At a block 502, a STA establishes a random delay time for a beacon interval. This random delay time is distributed (e.g., uniformly distributed) between zero and a range maximum value. The range maximum value may be calculated in accordance with Equation (2), above. Thus, the range maximum value may be based on the parameter, B_Time. As described above, B_Time may be generated according to various approaches.

In one approach, B_Time is based on the maximum number of directional beacon transmissions the STA can make. For instance, B_Time may be based on Equation (3), above. In another approach, B_Time is based on the number of directional transmissions the STA plans to send in its next beacon. For instance, B_Time may be determined based on Equation (4), above.

At a block 504, the beacon interval begins. In the context of IEEE 802.11 networks, this occurs at a target beacon transmission time (TBTT). Based on this, at a block 506, the STA in a mmWave IBSS suspends the decrementing of backoff timer(s) for any pending non-mmWave Beacon transmissions.

The STA waits for the random delay time at a block 508. This may involve the STA decrementing a counter that is set to the delay time established at block 502.

At a block 510, the STA determines whether it has received a beacon frame from another STA in the network (e.g., another STA in the same IBSS of which the STA is a member) before the random delay time has elapsed. If not, then operation proceeds to a block 512. At this block, the STA sends its millimeter wave beacon frame in the form of one or more directional transmissions.

However, if it is determined at block 510 that the STA received such a beacon frame before the random delay time has elapsed, then operation proceeds to a block 514. At this block, the STA defers any beacon transmission plans until a subsequent beacon interval (e.g., the next TBTT). Thus, FIG. 5 indicates that, after block 514, operation may return to block 502.

Figure 6:
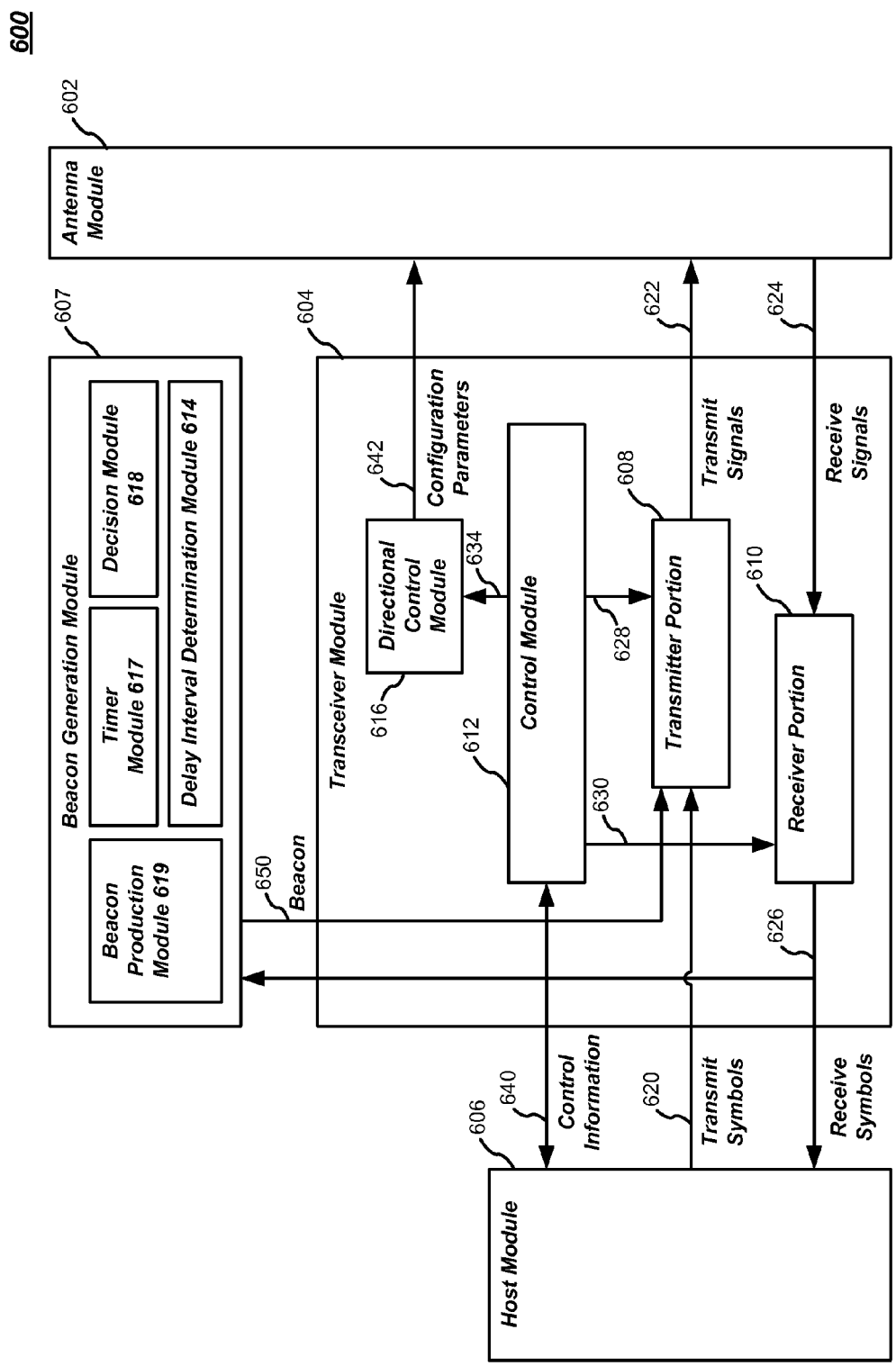
FIGS. 6 and 7 are diagrams of exemplary device implementations.

FIG. 6 is a diagram of an implementation 600 that may be included in a wireless device, such as a STA. As shown in FIG. 6, implementation 600 may include an antenna module 602, a transceiver module 604, a host module 606, and a beacon generation module 607. These elements may be implemented in hardware, software, or any combination thereof.

Antenna module 602 provides for the exchange of wireless signals with remote devices. Moreover, antenna module 602 may transmit wireless signals through one or more directional radiation patterns. Thus, antenna module 602 may include multiple antennas and/or multiple radiating elements (e.g., phased-array radiating elements). Details regarding exemplary implementations of antenna module 602 are described below with reference to FIG. 7.

FIG. 6 shows that transceiver module 604 includes a transmitter portion 608, a receiver portion 610, a control module 612, and a directional control module 616. These elements may be implemented in hardware, software, or any combination thereof.

Transceiver module 604 provides an interface between antenna module 602 and host module 606. For instance, transmitter portion 608 within transceiver module 604 receives symbols 620 from host module 606 and generates corresponding signals 622 for wireless transmission by antenna module 602. This may involve operations, such as modulation, amplification, and/or filtering. However, other operations may be employed.

Conversely, receiver portion 610 within transceiver module 604 obtains signals 624 received by antenna module 602 and generates corresponding symbols 626. In turn, receiver portion 610 provides symbols 626 to host module 606 and beacon generation module 607. This generation of symbols 626 may involve operations, including (but not limited to) demodulation, amplification, and/or filtering.

The symbols exchanged between host module 606 and transceiver module 604 may form messages or information associated with one or more protocols, and/or one or more user applications. Thus, host module 606 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

For example, when sending non-beacon traffic (e.g., data), host module 606 may perform media access techniques that employ delay times or backoff intervals. These times or intervals may be based at least on a minimum contention window value. As described herein, this minimum content window value (e.g., aCWmin) may be different from the minimum contention window employed for beacon transmissions (e.g., aCWminMMwaveIBSS). Embodiments, however, are not limited to this arrangement.

In addition, host module 606 may exchange control information 640 with transceiver module 604. This control information may pertain to the operation and status of transceiver module 604. For instance, control information 640 may include directives that host module 606 sends to transceiver module 604. Such directives may establish operating parameters/characteristics for transceiver module 604. Also control information 640 may include data (e.g., operational status information) that host module 606 receives from transceiver module 604.

As described above, transmitter portion 608 generates signals 622 from symbols 620, and receiver portion 610 generates symbols 626 from received signals 624. To provide such features, transmitter portion 608 and receiver portion 610 may each include various components, such as modulators, demodulators, amplifiers, filters, buffers, upconverters, and/or downconveters. Such components may be implemented in hardware (e.g., electronics), software, or any combination thereof.

Signals 622 and 624 may be in various formats. For instance, these signals may be formatted for transmission in IEEE 802.11, IEEE 802.15, WiGig, and/or IEEE 802.16 networks. However, embodiments are not limited to these exemplary networks may be employed.

Control module 612 governs various operations of transceiver module 604. For instance, control module 612 may establish operational characteristics of transmitter portion 608 and receiver portion 610. Such characteristics may include (but are not limited to) timing, amplification, modulation/demodulation properties, and so forth. As shown in FIG. 6 the establishment of such characteristics may be implemented in directives 628 and 630, which are sent to transmitter portion 608 and receiver portion 610, respectively.

In addition, control module 612 governs the employment of directional transmission features. In particular, FIG. 6 shows control module 612 generating directives 634, which are sent to directional control module 616. Based on directives 634, directional control module 616 generates configuration parameters 642, which are sent to antenna module 602.

Configuration parameters 642 may specify particular parameters to be applied to each antenna and/or radiating element within antenna module 602. Examples of such parameters include (but are not limited to) amplification gains, attenuation factors, and/or phase shift values. In embodiments, configuration parameters 642 include multiple parameter sets. Each of these sets includes one or more parameters for a directional transmission pattern specified in a sequence of directional transmissions. In coordination with this, transmitter portion 608 may produce (in signals 622) a transmission multiple times (e.g., once for each directional transmission). This production may be synchronized with antenna module 602's employment of configuration parameters 642.

Beacon generation module 607 generates beacons in accordance with the techniques described herein. As shown in FIG. 6, beacon generation module 607 includes a delay interval determination module 614, a timer module 617, a decision module 618, and a beacon production module 619. These elements may be implemented in any combination of hardware and/or software.

Delay interval determination module 614 determines a delay time to be employed during a beacon interval. This delay time may be generated in accordance with the techniques described herein. In turn, timer module 617 establishes a time period having a duration of the delay time. This time period commences at the beginning of a beacon interval (e.g., at a TBTT).

As described above, beacon generation module 607 receives symbols 626. As these symbols correspond to signals received by antenna module 602, decision module 618 determines from these symbols whether a beacon from another device (e.g., a device in the same IBSS) has been received during the time period established by timer module 617. Thus, decision module 618 may include control logic to identify beacons. Such control logic may be implemented in any combination of hardware (e.g., circuitry) and/or software.

If decision module 618 determines that no beacon has been received during this time period, then beacon production module 619 generates a beacon 650 upon the time period's conclusion. In turn, the beacon is sent to transmitter portion 608 for wireless transmission (as signals 622) via antenna module 602. As described herein, this wireless transmission may include multiple directional transmissions. Such multiple transmissions may be coordinated through directional control module 616 and transmitter portion 608.

However, if a beacon is received during this time period, then beacon generation module 607 defers any beacon transmission efforts until a subsequent (e.g., next) beacon interval.

Figure 7:
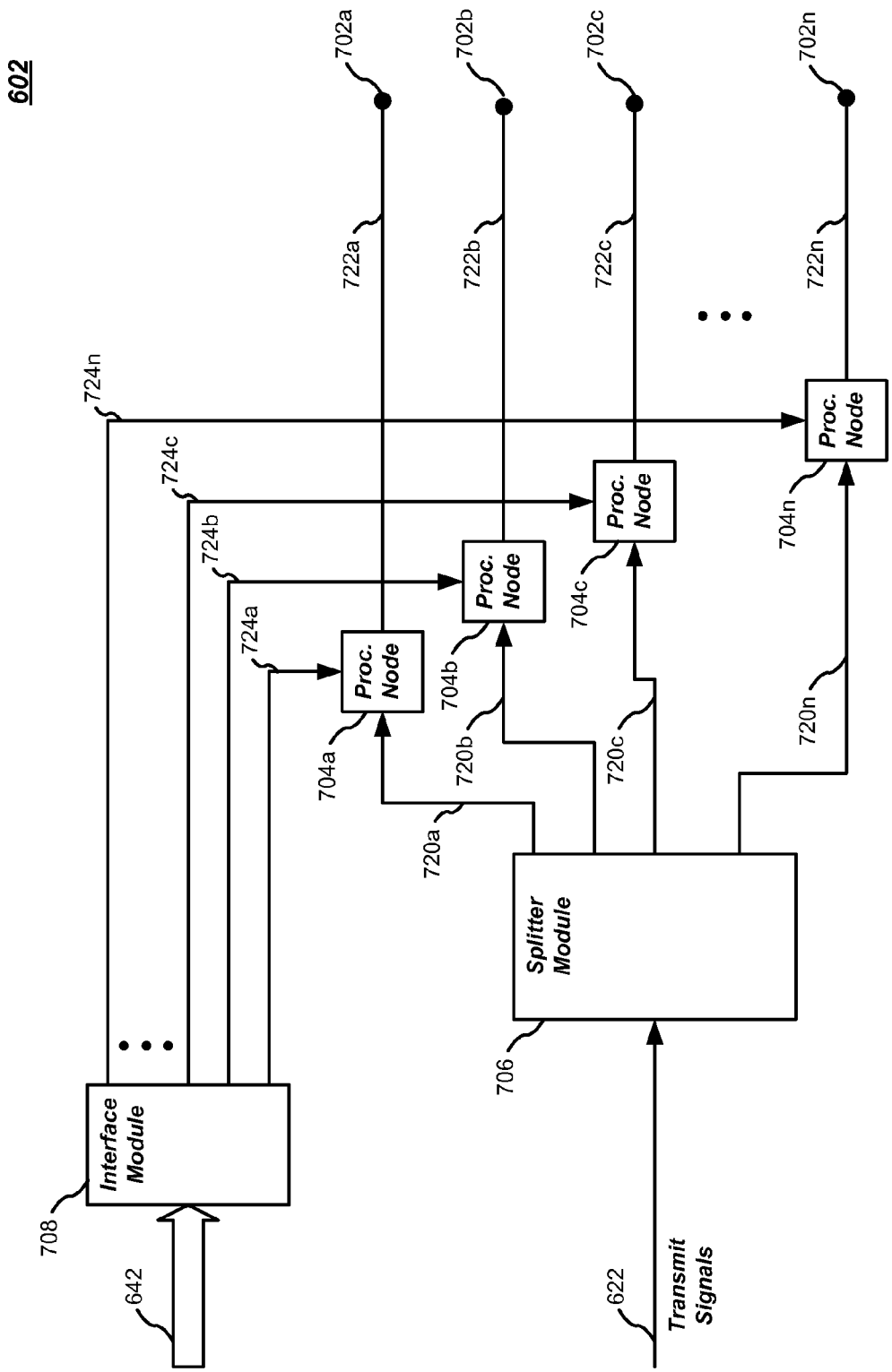

FIG. 7 is a diagram showing an exemplary implementation of antenna module 602. As shown in FIG. 7, this implementation includes multiple radiating elements 702a-n, multiple processing nodes 704a-n, a splitter module 706, and an interface module 708. These elements may be implemented in hardware, software, or any combination thereof.

Each radiating element 702 may be a distinct antenna. Alternatively or additionally, each radiating element 702 may be a radiating element within a phased-array or switched-beam antenna. Thus, together, radiating elements 702a-n may form any combination of one or more distinct antennas, one or more phased arrays, and/or one or more switched beam antennas. As shown in FIG. 7, radiating elements 702a-n are each coupled to a corresponding one of processing nodes 704a-n.

As shown in FIG. 7, splitter module 706 receives signal 622 (which is generated by transceiver module 604 of FIG. 6). Upon receipt, splitter module 706 "splits" signal 622 into substantially identical input signals 720a-n. This splitting may occur with some degree of insertion loss. Also, splitter module 706 may perform operations, such as amplification and/or filtering. Input signals 720a-n are sent to processing nodes 704a-n, respectively.

Processing nodes 704a-n generate processed signals 722a-n from input signals 720a-n, respectively. In turn, processed signals 722a-n are sent to radiating elements 702a-n, respectively. In generating processed signals 722a-n, processing nodes 704a-n may perform various operations on input signals 720a-n.

Examples of such operations performed by processing nodes 704a-n include (but are not limited to) attenuation, amplification, and/or phase shifting. Switching is a further exemplary operation. For example, one or more of processing nodes 704a-n may selectively pass or block their corresponding input signal(s) 720. Thus, when an input signal 720 is blocked, its corresponding output signal 722 may be a zero energy (nulled) signal.

The manner in which processing nodes 704a-n generate processed signals 722a-n is determined by control signals 724a-n, respectively. Thus, these signals may convey attenuation factors, amplification gains, phase shift values, switching directives, and so forth.

In embodiments, control signals 724a-n are included in configuration parameters 642, which are received by interface module 708. These parameters may be received in various formats (e.g., analog, digital, serial, parallel, etc.). Interface module 708 extracts these parameters and formats them as control signals 724a-n. As described above, control signals 724a-n are sent to processing nodes 704a-n, respectively.

The implementation of FIG. 7 is shown for purposes of illustration and not limitation. Accordingly, implementations of antenna module 702 may include other elements. For example, implementations may include one or more amplifiers and/or filters. Such amplifier(s) and/or filters may be coupled between processing nodes 704a-n and radiating elements 702a-n.

A broadcast scenario is now described with reference to FIGS. 6 and 7. In this scenario, each of radiating elements 702a-n is an antenna having a particular radiation pattern. For example, the patterns of radiating elements 702a-n may respectively correspond to multiple transmission sectors, such as sectors $S_1$-$S_6$ of FIG. 2.

Accordingly, in this scenario, processing nodes 704a-n operate as switching nodes that may pass or block input signals 720a-n, respectively. As described above, processing nodes 704a-n are controlled by control signals 724a-n, respectively. In this case, these control signals convey binary switching commands (e.g., having states switch open or switch close).

Since each of radiating elements 702a-n corresponds to a particular radiation pattern, control signals 724a-n may sequentially select one of processing nodes 704a-n to be open, and the remaining processing nodes to be closed. Thus, through this exemplary selection technique, only one of radiating elements 702a-n emits a signal at a time.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
   establishing a delay time, the delay time based at least on a directional beacon transmission characteristic of a wireless communications device;
   determining whether a beacon transmission is received from a remote device during a time period, the time period beginning at a start of a beacon interval in a distributed wireless communications network, and the time period having a duration of the delay time, the delay time comprising a maximum value based at least in part on at least one of a first number of directional beacon transmissions the wireless communication device is capable of sending within the beacon interval, or a second number of directional beacon transmissions the wireless communication device is planning to send within the beacon interval; and when a beacon transmission is not received from a remote device during the time period, the wireless communications device sending one or more directional beacon transmissions upon completion of the time period.

2. The method of claim 1, wherein establishing the delay time comprises randomly generating the delay time to be between zero and the maximum value.

3. The method of claim 2:
wherein the maximum value is based at least on a first minimum contention window value, the first minimum contention window value for beacons; and
wherein the first minimum contention window value is different from a second minimum contention window value, the second minimum contention window value for non-beacon medium access.

4. The method of claim 1, further comprising:
when a beacon transmission is received from a remote device during the time period, the wireless communications device refraining from sending any beacon transmissions during the beacon interval.

5. The method of claim 1, wherein the one or more directional beacon transmissions are each millimeter wave wireless transmissions.

6. The method of claim 1, wherein the start of the beacon interval is a target beacon transmission time (TBTT).

7. The method of claim 1, wherein the distributed wireless communications network is an Independent Basic Service Set (IBSS).

8. An apparatus, comprising:
a beacon generation module, comprising one or more processors to establish a delay time based at least on a directional beacon transmission characteristic of the apparatus, and to generate a beacon when a beacon transmission is not received from a remote device during a time period, wherein the time period begins at a start of a beacon interval in a distributed wireless communications network and has a duration of the delay time, the delay time comprising a maximum value based at least in part on at least one of a first number of directional beacon transmissions the apparatus is capable of sending within the beacon interval, or a second number of directional beacon transmissions the apparatus is planning to send within the beacon interval; and a plurality of radiating elements to wirelessly transmit the beacon in two or more directional transmissions within the beacon interval.

9. The apparatus of claim 8, wherein the beacon generation module is to randomly generate the delay time to be between zero and the maximum value.

10. The apparatus of claim 8, wherein the start of the beacon interval is a target beacon transmission time (TBTT).

11. The apparatus of claim 8, wherein the distributed wireless communications network is an Independent Basic Service Set (IBSS).

12. The apparatus of claim 8:
wherein the beacon generation module is to generate the delay time based at least on a first minimum contention window value, the first minimum contention window value for beacons; and
wherein the first minimum contention window value is different from a second minimum contention window value, the second minimum contention window value for non-beacon medium access.

13. An article comprising a machine-accessible medium having stored thereon instructions that, when executed by a machine, cause the machine to:
establish a delay time, the delay time based at least on a directional beacon transmission characteristic of a wireless communications device;
determine whether a beacon transmission is received from a remote device during a time period, the time period beginning at a start of a beacon interval in a distributed wireless communications network, and the time period having a duration of the delay time, the delay time comprising a maximum value based at least in part on at least one of a first number of directional beacon transmissions the machine is capable of sending within the beacon interval, or a second number of directional beacon transmissions the machine is planning to send within the beacon interval; and
when a beacon transmission is not received from a remote device during the time period, send one or more directional beacon transmissions upon completion of the time period.

14. The article of claim 13, further comprising instructions that, when executed, cause the machine to:
when a beacon transmission is received from a remote device during the time period, refrain from sending any beacon transmissions during the beacon interval.

15. The article of claim 13, further comprising instructions that, when executed, cause the machine to randomly generate the delay time to be between zero and the maximum value.

* * * * *